US008964549B2

(12) United States Patent
Vos et al.

(10) Patent No.: US 8,964,549 B2
(45) Date of Patent: Feb. 24, 2015

(54) METHOD AND APPARATUS FOR MANAGING WIRELESS COMMUNICATION BASED ON NETWORK TRAFFIC LEVEL

(75) Inventors: Gustav Gerald Vos, Surrey (CA); Kevin Walton, Vancouver (CA); Recep Serkan Dost, Richmond (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 136 days.

(21) Appl. No.: 13/165,555

(22) Filed: Jun. 21, 2011

(65) Prior Publication Data
US 2012/0099430 A1    Apr. 26, 2012

Related U.S. Application Data

(60) Provisional application No. 61/357,436, filed on Jun. 22, 2010.

(51) Int. Cl.
*H04L 12/26* (2006.01)
*H04W 28/02* (2009.01)
*H04L 12/823* (2013.01)
(Continued)

(52) U.S. Cl.
CPC .............. *H04W 28/02* (2013.01); *H04L 47/32* (2013.01); *H04L 47/10* (2013.01); *H04W 24/08* (2013.01)
USPC ........... 370/235; 370/232; 370/352; 370/386; 370/338; 455/522

(58) Field of Classification Search
USPC .............. 370/352, 386, 395.1, 235, 232, 338; 455/522
See application file for complete search history.

(56) References Cited

U.S. PATENT DOCUMENTS

| 5,418,943 A | 5/1995 | Borgida et al. |
| 6,112,101 A * | 8/2000 | Bhatia et al. ................... 455/512 |

(Continued)

FOREIGN PATENT DOCUMENTS

| EP | 1617606 A1 | 1/2006 |
| EP | 1903349 A1 | 3/2008 |

(Continued)

OTHER PUBLICATIONS

Chantaraskul, S., et al., "An Intelligent-Agent Approach for Congestion Management in 3G Networks", Abstract—J. Of Comp. Science, 2007.

(Continued)

*Primary Examiner* — Ian N Moore
*Assistant Examiner* — Phong La
(74) *Attorney, Agent, or Firm* — Holland & Hart LLP (57) ABSTRACT

The present invention provides a method for managing communications of a wireless device in a wireless communication system based on network traffic level, and a wireless device comprising a control system configured to evaluate a network traffic level. The wireless device may be configured to transmit data, such as delay-tolerant data, based upon the network traffic level, for example transmitting data only under low traffic conditions. Deferring delay-tolerant communications may result in lower peak traffic conditions in the network. Evaluating the network traffic level may comprise measuring chip energy over total energy (Ec/Io), monitoring data on shared control channels such as HS-SCCH of a HSDPA system, inferring power allocated to channels by a dynamic power allocation scheme, or other methods.

24 Claims, 5 Drawing Sheets

(51) Int. Cl.
*H04L 12/801* (2013.01)
*H04W 24/08* (2009.01)

(56) References Cited

U.S. PATENT DOCUMENTS

| | | | |
|---|---|---|---|
| 6,717,915 B1* | 4/2004 | Liao et al. | 370/252 |
| 6,754,179 B1 | 6/2004 | Lin | |
| 6,937,863 B1 | 8/2005 | Gordon et al. | |
| 7,426,194 B2 | 9/2008 | Shenfield et al. | |
| 7,489,636 B1* | 2/2009 | Cheung | 370/235.1 |
| 7,587,217 B1* | 9/2009 | Laakso et al. | 455/522 |
| 7,961,611 B1* | 6/2011 | Medhat et al. | 370/230 |
| 8,121,074 B1* | 2/2012 | Loc et al. | 370/328 |
| 8,125,919 B1* | 2/2012 | Khanka et al. | 370/252 |
| 8,144,675 B1* | 3/2012 | Loc et al. | 370/338 |
| 2002/0075802 A1* | 6/2002 | Sugama et al. | 370/230.1 |
| 2002/0105949 A1* | 8/2002 | Shinomiya | 370/386 |
| 2004/0072565 A1 | 4/2004 | Nobukiyo et al. | |
| 2004/0203834 A1 | 10/2004 | Mahany | |
| 2005/0078648 A1* | 4/2005 | Nilsson | 370/342 |
| 2006/0126507 A1* | 6/2006 | Nakayasu | 370/229 |
| 2006/0142021 A1 | 6/2006 | Mueckenheim et al. | |
| 2007/0111669 A1* | 5/2007 | Malladi | 455/67.13 |
| 2007/0242606 A1 | 10/2007 | Chen | |
| 2007/0259673 A1* | 11/2007 | Willars et al. | 455/453 |
| 2008/0019277 A1* | 1/2008 | Schultz et al. | 370/236 |
| 2008/0032733 A1* | 2/2008 | Hays | 455/522 |
| 2008/0095185 A1* | 4/2008 | DiGirolamo et al. | 370/464 |
| 2008/0120512 A1 | 5/2008 | Wang | |
| 2008/0151838 A1* | 6/2008 | Lauderdale et al. | 370/335 |
| 2008/0160988 A1* | 7/2008 | Jami et al. | 455/423 |
| 2008/0209035 A1 | 8/2008 | Barranco et al. | |
| 2008/0233922 A1* | 9/2008 | Lesrel | 455/412.1 |
| 2008/0268786 A1* | 10/2008 | Baker et al. | 455/67.11 |
| 2008/0313255 A1 | 12/2008 | Geltner et al. | |
| 2009/0088173 A1* | 4/2009 | Motegi et al. | 455/450 |
| 2009/0111506 A1* | 4/2009 | Laroia et al. | 455/550.1 |
| 2009/0225657 A1* | 9/2009 | Haggar et al. | 370/235 |
| 2009/0286545 A1* | 11/2009 | Yavuz et al. | 455/452.1 |
| 2009/0318156 A1* | 12/2009 | Ode et al. | 455/438 |
| 2009/0323541 A1* | 12/2009 | Sagfors et al. | 370/252 |
| 2010/0159944 A1 | 6/2010 | Pascal et al. | |
| 2010/0246404 A1 | 9/2010 | Bradford et al. | |
| 2011/0149795 A1* | 6/2011 | Tanaka et al. | 370/253 |
| 2011/0199901 A1 | 8/2011 | Kavanaugh et al. | |
| 2012/0281675 A1* | 11/2012 | Liang et al. | 370/331 |

FOREIGN PATENT DOCUMENTS

| | | |
|---|---|---|
| EP | 2234441 A1 | 9/2010 |
| WO | 2004/006603 | 1/2004 |
| WO | 2004/034715 A1 | 4/2004 |
| WO | 2005/017707 A2 | 2/2005 |
| WO | 2009/000908 A2 | 12/2008 |
| WO | 2009/100756 A1 | 8/2009 |
| WO | 2009/127254 A1 | 10/2009 |

OTHER PUBLICATIONS

Nadas, S., et al., "Providing Congestion Control in the Iub Transport Network for HSDPA"; IEEE Globecom 2007 Proc.

Kumar, S., et al., "Ubiquitous Computing for Remote Cardiac Patient Monitoring: A Survey", Hindawi Publishing Corp., 2008.

Diaz, A., "Customer-centric Measurements on Mobile Phones", IEEE Intern. Symposium on Consumer Electronics, 2008.

Inamura, H., et al., "TCP Over Second (2.5G) and Third (3G) Generation Wireless Networks", RFC 3481.

Aiache, H., et al., "A Load Dependent Metric for Balancing Internet Traffic in Wireless Mesh Networks", Thales Communications, France, 2008.

Schols, H., "Notes on Delay-Insensitive Communication," Computing Science Notes, Eindhoven University of Technology, 1988.

Du, et al., "Intelligent Cellular Network Load Balancing Using a Cooperative Negotiation Approach," 2003 IEEE Wireless Communications and Networking (WCNC 2003), vol. 3, pp. 1675-1679, Mar. 2003.

3GPP TS 23.107 V3.0.0: "QoS Concept and Architecture," Oct. 1999.

Digi International Inc., White Paper: "Efficient Data Transfer Over Cellular Networks", Copy obtained in 2010.

Walter, K.D., "Implementing M2M Applications Via GPRS, EDGE and UMTS," M2M Alliance e.V., Aachen, Germany, Copy obtained in 2010.

3GPP TS 22.268 V 1.0.0: "Service Requirements for Machine-Type Communications," Stage 1 (Release 10), Aug. 2009.

3GPP TS 22.368 V1.1.1: "Service Requirements for Machine-Type Communications," Stage 1 (Release 10), Nov. 2009.

3GPP TR 22.868 V8.0.0: "Study on Facilitating Machine to Machine Communication in 3GPP Systems," (Release 8), Mar. 2007.

\* cited by examiner

METHOD AND APPARATUS FOR MANAGING WIRELESS COMMUNICATION BASED ON NETWORK TRAFFIC LEVEL

FIELD OF THE INVENTION

The present invention pertains in general to managing communication of wireless devices in wireless communication systems, and in particular to a method and apparatus for managing wireless communication based on network traffic level.

BACKGROUND

In addition to voice services, the evolution of wireless communication networks has increased the availability of data services and their adoption for remote communication between users and machine terminals, for example for data collection and submission from wireless meters and teller machines. This has emphasized certain aspects of traffic management in wireless communication systems that are different from those occurring in traditional voice communications as many applications for machine communication exhibit different real-time communication requirements with different tolerances for communication delays. Some of the terms typically used in the art to refer to communications with machine terminals include machine-terminal communication or machine-type communication (MTC), or machine-to-machine communication (M2M).

Wireless communication networks provide a means for effective access to other data networks for mobile wireless devices and other applications. To realize this, a number of data services have been designed for wireless communication networks that facilitate wireless communication. Wireless data transmission is supported by digital wireless communication systems including GPRS (general packet radio service) and GSM (Global System for Mobile Communication) or UMTS (Universal Mobile Telephone System) and will be part of the LTE (Long Term Evolution) system, for example, which are readily known. Protocols such as HSDPA (high-speed downlink packet access) and HSUPA (high-speed uplink packet access) may be used to enable data services, for example in UMTS systems.

The architecture of wireless communication systems typically provides for hierarchies comprising one or more sub-networks that provide predetermined functions and/or services to predetermined areas. Infrastructure servicing different areas is then interconnected by a corresponding backbone network, which in itself is organized in a hierarchical fashion. A subnetwork generally comprises a number of packet data service nodes connected in such a way that it can provide a packet-switched service for wireless devices via several base stations. The intermediate mobile communication network provides packet-switched data transmission between a support node and wireless devices. Certain subnetworks may be connected to an external data network, for example, to a public switched data or phone network, via predetermined gateway nodes for relaying corresponding services. Wireless communication system services thus allow packet data transmission between wireless devices and external data networks.

The wireless nature of the communication in wireless communication systems proves useful for applications in mobile wireless devices as well as for convenient interconnection of wireless devices which may not necessarily require full or partial mobility. Aspects of mobility of a growing number of wireless devices for machine communication, for example, may differ significantly from mobile phones traditionally used for human-to-human voice communication.

Wireless communication system design, traditionally, has addressed mobility collectively equally for all wireless devices. For example, aspects of communication management in wireless communication systems may occur substantially instantaneously within the abilities of the wireless communication system without further discriminating between different needs for communications to and/or from different types of wireless devices. The ability to perform communications between all types of wireless devices at any time in an uncoordinated manner may cause significant amounts of network traffic and congest the network at times of peak demand. Because of this simple communications management, existing wireless communication systems typically need to be dimensioned for peak traffic to avoid overloading and congestion.

The need for more sophisticated communications management is described in Technical Specification: "Service requirements for machine-type communications", Stage 1, 3GPP TS 22.368 V1.1.1. This reference describes aspects of increased network traffic caused by various forms of M2M communications. It, however, does not teach a solution.

Therefore there is a need for a solution that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for managing wireless communication based on network traffic level. According to an aspect of the present invention there is provided a method for managing communication of a wireless device with a wireless communication system, the method comprising: evaluating a network traffic level based at least in part upon signals associated with communications in the wireless communication system, said signals associated at least in part with communications other than communications with the wireless device, wherein said signals are monitored and evaluated using the wireless device; and selectively transmitting data from the wireless device based upon the network traffic level.

According to another aspect of the present invention there is provided a wireless device for communication with a wireless communication system, the wireless device comprising: a network interface for establishing an operative connection with the wireless communication system; and a control system operatively coupled to the network interface, the control system configured to evaluate a network traffic level based at least in part upon signals received via the network interface and associated with communications in the wireless communication system, said signals associated at least in part with communications other than communications with the wireless device, the control system further configured to selectively control transmission of data from the network interface based upon the network traffic level.

According to another aspect of the present invention there is provided a computer program product comprising a memory having computer readable code embodied therein, for execution by a CPU, for performing a method for managing communication of a wireless device with a wireless communication system, the method comprising: evaluating a network traffic level based at least in part upon signals associated with communications in the wireless communication system, said signals associated at least in part with communications other than communications with the wireless device; and selectively transmitting data from the wireless device based upon the network traffic level.

DETAILED DESCRIPTION OF THE INVENTION

Definitions

The term "wireless device" is used to refer to an apparatus for analog and/or digital transmission and/or reception of signals for communication purposes via electromagnetic radiation propagating, for example, through vacuum, or air, or a generally non-conductive medium to or from another apparatus. The wireless device may use signals formatted according to one or more of a number of communication systems including mobile phone networks such as cellular or satellite phone networks, or other current or future wireless communication systems, for example. A wireless device can comprise or be included in one or more of various forms of handheld/mobile and/or stationary communication, control and/or computing devices such as a meter reader, teller machine, vehicle or goods tracker or theft alarm apparatus, radio, mobile phone, cellular phone, satellite phone, Smartphone, or a personal computer (PC) such as a desktop, notebook, tablet PC, personal digital assistant (PDA), game console, or peripherals such as a printer, camera, pointing device, or other apparatus, for example.

The term "network sector" is used to refer to a portion of a wireless communication system. The term is used in combination with a conceptual portioning of the wireless communication system into parts of a wireless communication system. The portioning may occur at a predetermined level in a hierarchy of a wireless communication system architecture. For example, in a cellular wireless communication system, a network sector may refer to portions of the communication system that are associated with a sector of a base transceiver station (BTS or Node B), a radio network controller (RNC), a serving general packet radio service (GPRS) support node (SGSN), a gateway GPRS support node (GGSN), a mobility management entity (MME), a serving gateway (S-GW), packet data network gateway (PDN-GW) or other part of the wireless communication system, for example.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Communications with various types of M2M/MTC wireless devices typically exhibit characteristics that are different in a number of ways from communications with other wireless network devices. For example, in contrast to traditional voice or data communications for users, M2M/MTC communications may involve larger numbers of communicating devices with comparatively little traffic per device. Communications involving several such wireless devices may, without further communications management, cause network traffic congestion and/or overload wireless communication systems. The present invention provides efficient and scalable improvements that may facilitate operation of wireless communication systems with substantially delay-tolerant communications to and/or from large numbers of wireless devices. For this purpose the present invention provides a method, an apparatus, a wireless device and other systems and methodologies for managing communication with a plurality of wireless devices in a wireless communication system.

The present invention provides a solution for the mitigation of congestion in wireless communication systems by configuring one or more wireless devices, such as M2M/MTC wireless devices, to evaluate a network traffic level and selectively transmit data based on the evaluated network traffic level. Such a wireless device may thereby be configured, for example, to defer at least some pending or arising delay-tolerant communications if the evaluated network traffic level is indicative of high network traffic conditions, and/or to initiate at least some pending or arising communications if the evaluated network traffic level is indicative of low network traffic conditions, wherein the terms "high traffic conditions" and "low traffic conditions" correspond to predetermined criteria. Pending communications may be previously deferred or other pending communications. Pending and/or arising communications may arise due to needs of operations serviced by the wireless device. For example, communications may arise in the course of operation of a machine such as an ATM or utility meter, which is configured to communicate messages such as queries or reports via the wireless device.

Delaying or deferring of at least some communications by a wireless device may have the effect of distributing over time the ensuing network traffic to and/or from certain wireless devices to aid in reducing network traffic congestion, for example by avoiding transmission of delay-tolerant data during peak times. Certain types of communications with certain types of wireless devices in certain network sectors may be delayed until network traffic conditions drop below certain thresholds, wherein different thresholds may be employed in different network sectors. For example, when a network traffic level is less than a corresponding threshold, a certain amount of additional communications may be sustained without overloading the wireless communication system within that particular network sector.

In some embodiments, predetermined criteria, such as traffic thresholds for determining "high traffic conditions" and/or "low traffic conditions," may be determined based on how much traffic the wireless communication system can sustain and how much traffic communication with the wireless devices may cause. For example, a traffic threshold may be based on the ratio of traffic per wireless device times the number of wireless devices divided by the maximum traffic load of the wireless communication network, wherein all these characteristics may be per network sector. As another example, a traffic threshold may correspond to some fraction of the maximum traffic that can be serviced at a predetermined quality level in a corresponding network sector.

According to an embodiment of the present invention, there is provided a method for managing communication of a wireless device with a wireless communication system. The method comprises evaluating a network traffic level based upon signals associated with communications in the wireless communication system. Generally speaking, such signals include signals indicative of communications other than communications with the wireless device being managed by the method. For example, some evaluated signals may be used for communicating between wireless devices such as cell phones, PDAs, or the like, and one or more base stations. In some embodiments, these signals may be monitored by the wireless device for other purposes in addition to purposes related to the present invention, such as power control, base station selection, channel quality monitoring, or the like. Evaluation may also be based in part on signals indicative of communication with the wireless device being managed by the method. The wireless communication system may be associated with a cellular network. GSM, UMTS, CDMA2000, LTE, Wi-Fi, WiMAX, or a like network, for example. The method further comprises selectively transmitting data from the wireless device based upon the network traffic level. For example, if, based on the network traffic level, it is determined that high traffic conditions currently exist in one or more network sectors, then transmission of pending or arising data may be delayed or deferred to a future time when the network traffic level is indicative of acceptably low traffic conditions.

Figure 1:
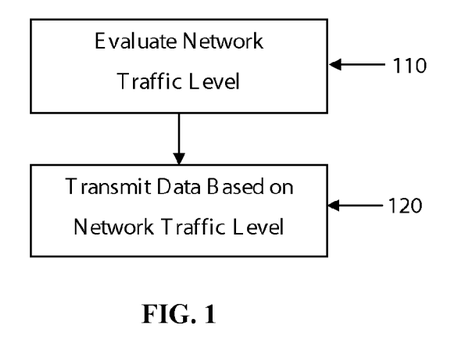
FIG. 1 illustrates a method for managing communication of a wireless device with a wireless communication system, in accordance with embodiments of the present invention.

FIG. 1 generally illustrates a method for managing communication of a wireless device in accordance with embodiments of the present invention. The method comprises evaluating 110 a network traffic level, based at least in part upon signals associated with communications in the wireless communication system other than communications with the wireless device, and possibly based in part on signals associated with communication with the wireless device. The method further comprises transmitting 120 data from the wireless device based upon the network traffic level, for example based upon the evaluated network traffic level relative to a predetermined threshold or similar condition.

Figure 2:
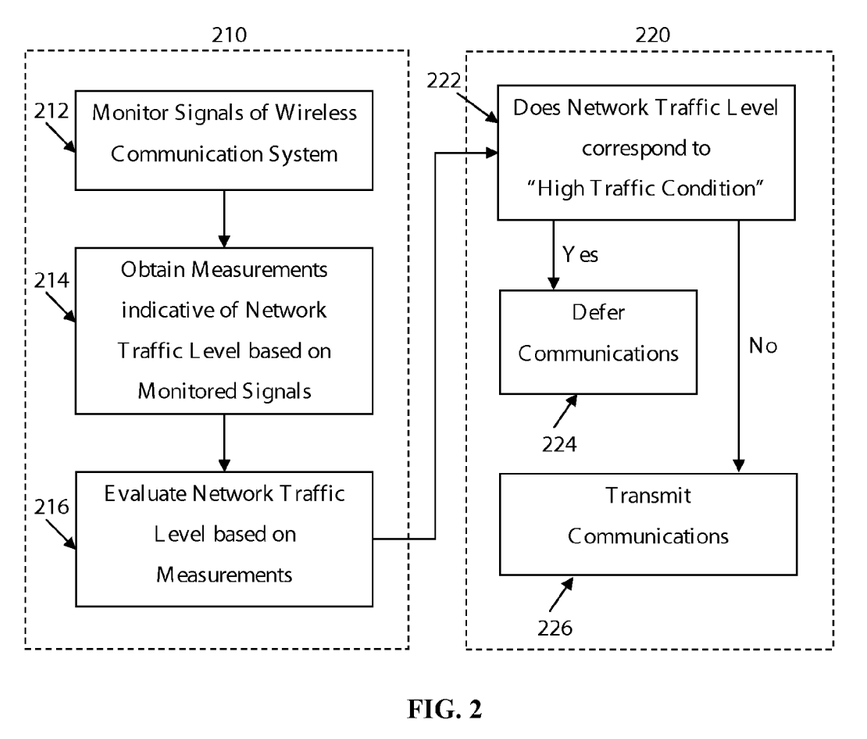
FIG. 2 illustrates a method for managing communication of a wireless device with a wireless communication system, in accordance with embodiments of the present invention.

FIG. 2 illustrates, in more detail, a method for managing communication of a wireless device in accordance with embodiments of the present invention. The method generally comprises monitoring and evaluation 210 of network traffic levels, and managing 220 data transmission based on evaluation in 210. Monitoring and evaluation 210 comprises monitoring 212 signals of the wireless communication system, for example by receiving wireless signals using a radio receiver and possibly performing processing operations, for example to monitor radio energy or power, decode, demodulate and/or otherwise read data carried by the signal, monitor events such as arrivals of messages, or the like, or a combination thereof. Monitoring and evaluation 210 further comprises obtaining 214 measurements indicative of network traffic level based on the signals monitored in 212. For example, radio energy and/or or power levels may be measured and tracked, arrival rates of messages on one or more channels may be measured, types and frequencies of CDMA spreading codes may be determined and measured, and the like. Monitoring and evaluation 210 further comprises evaluating 216 a network traffic level based on measurements obtained in 214. Evaluation 216 may comprise, for example, utilizing the obtained measurements as input to a programmed model, and receiving as output a value indicative of current network traffic in a network sector.

Continuing with respect to FIG. 2, managing 220 data transmission may comprise determining 222 whether the evaluated network traffic level of 216 corresponds to a high-traffic condition, for example by comparing the network traffic level with one or more predetermined threshold values. If a high-traffic condition is determined, pending communications, and/or arising communications for a predetermined future time period, may be deferred 224 until a later time, for example when the high-traffic condition subsides, or when a communication can tolerate no more delays, or a combination thereof. For example, in some embodiments, a communication may increase through several priority levels the longer it is delayed, and when the priority level reaches a threshold, which is a function of the current network traffic conditions, the communication is transmitted. If the high-traffic condition is not determined, pending and/or arising communications may be transmitted 226.

According to another embodiment of the present invention, there is provided a wireless device for communication with a wireless communication system. The wireless device comprises a network interface for establishing an operative connection with the wireless communication system. For example, the network interface may comprise a wireless transceiver configured to couple with a wireless communication system such as a system associated with a cellular network, GSM, UMTS, CDMA2000, LTE, Wi-Fi or WiMAX network, or the like. The wireless device further comprises a control system operatively coupled to the network interface. The control system is configured to evaluate a network traffic level based upon signals received via the network interface and associated with communications in the wireless communication system, for example including signals associated with communications other than communications with the wireless device. The control system is configured to selectively control transmission of data from the network interface based upon the network traffic level.

Figure 3:
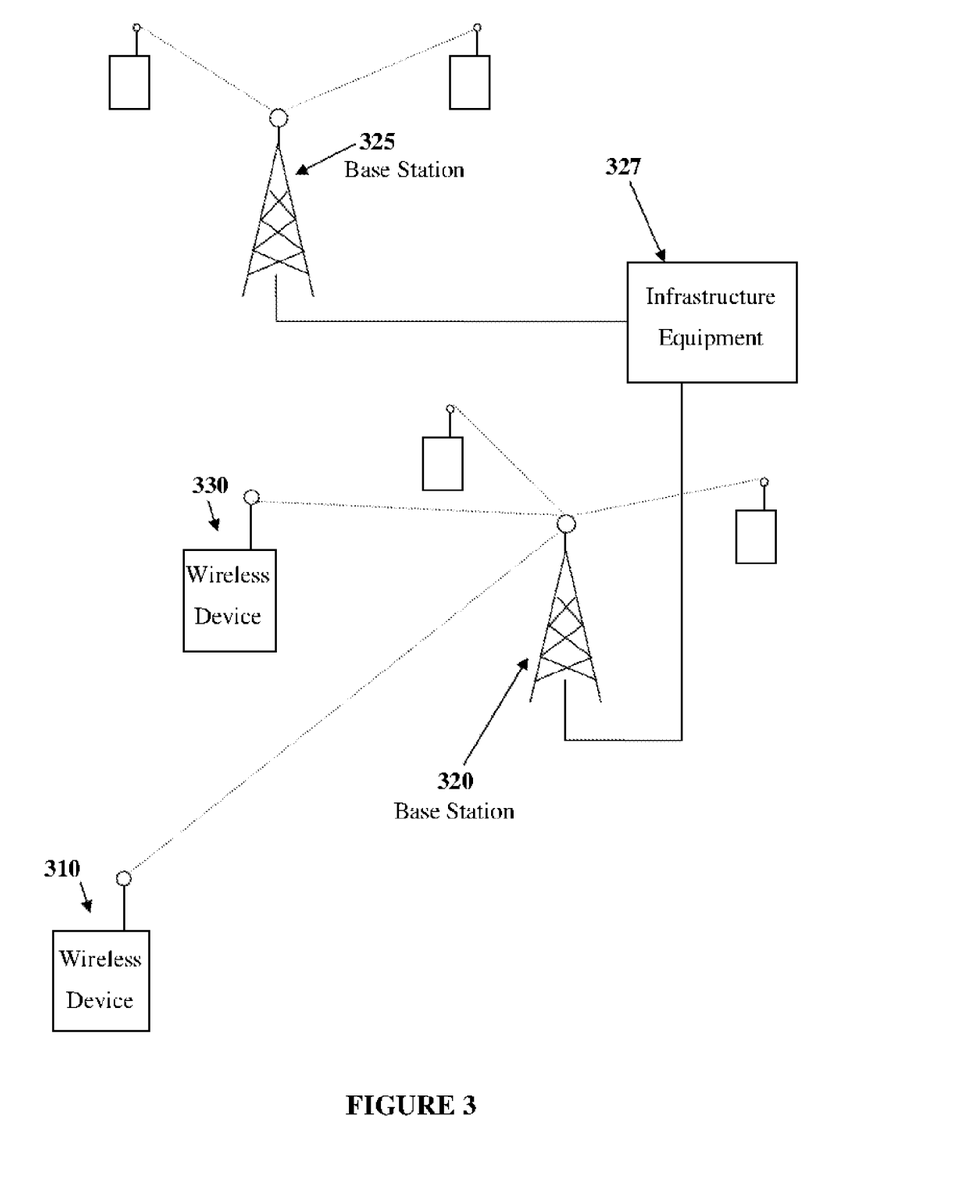
FIG. 3 illustrates a wireless communication system with respect to which embodiments of the present invention interact.

FIG. 3 illustrates a wireless communication system with which a wireless device 310, configured according to embodiments of the present invention, is configured to communicate via a network interface thereof. The wireless communication system may operate in accordance with a wireless communication protocol such as UMTS, or the like. As illustrated, the wireless communication system comprises a base station 320, or Node B or wireless access point, or the like, communicatively coupled to the wireless device 310, and typically to a number of other wireless devices such as device 330. The other wireless devices may be M2M/MTC devices, wireless devices configured in accordance with the present invention, mobile wireless devices such as cellular telephones, PDAs, wireless-enabled cameras, laptops, vehicle-mounted wireless systems, or the like. The wireless communication system may further comprise other base stations. Node Bs, wireless access points, or the like, such as base station 325, which may be communicatively coupled with other wireless devices. The base stations may be communicatively coupled with each other and with data networks, telephone networks, other wireless communication systems, and the like, via infrastructure equipment 327, such as equipment of a network backbone.

According to another embodiment of the present invention, there is provided a computer program product comprising a memory having computer readable code embodied therein, for execution by a CPU, for performing a method for managing communication of a wireless device with a wireless communication system, such as a method described herein.

Embodiments of the present invention enable one or more wireless devices to each evaluate and react to varying network traffic levels substantially independently. Such an arrangement may reduce system resource requirements, for example by reducing the role of and/or need for a centralized device to communicate with and manage operations of plural wireless devices. For example, in some embodiments, rather than using a central device to evaluate network traffic levels and react by selecting, contacting and activating one or more wireless devices upon the network traffic level, such a central device, or equivalent and appropriately configured network resources, can contact wireless devices to be managed infrequently, for example only to change settings thereof, and relying on the wireless devices to activate themselves under predetermined conditions. In some embodiments, a central device for device management may not be required at all, but rather the wireless devices may be pre-configured, for example upon deployment. Other configurations may also be used, for example distributed or decentralized systems for wireless device management, wherein plural wireless devices replace the role of a central management device, and/or plural wireless devices communicate with each other to facilitate group self-management.

Signals Associated with the Wireless Communication System

In accordance with embodiments of the present invention, evaluation of a network traffic level is based upon one or more signals associated with communications in the wireless communication system. These signals may be received for example via a wireless device and/or network interface thereof. At least a portion of these signals may be associated with communications in the wireless communication system other than communications with the wireless device which is performing evaluation of the network traffic level, or the wireless device being managed by a method for managing communications, in accordance with embodiments of the present invention.

For example, one or more signals may be indicative of messages passed to and/or from other wireless devices in the wireless communication system, which may be passively monitored and used for evaluating a network traffic level. Embodiments of the present invention may thereby take advantage of the commonality of the radio medium to "eavesdrop" on other communications to facilitate evaluation of network traffic levels. The one or more signals may correspond to one or more data channels, control channels, or the like, of a wireless communication system operating in accordance with one or more predetermined protocols, such as CDMA2000, UMTS, GSM, HSDPA, Wi-Fi, WiMAX, or the like.

In some embodiments, signals associated with communications in the wireless communication system, upon which evaluation of network traffic level is based, may include signals carrying communication to the wireless device of the present invention, and/or associated with a method of the present invention. For example, signal-to-noise ratios or signal-to-interference-plus-noise ratios may be evaluated based at least in part on the signal strength corresponding to messages intended for a wireless device of the present invention. In some embodiments, signals associated with communications in the wireless communication system, upon which evaluation of network traffic level is based, may include signals carrying communication to plural wireless devices, of which a wireless device of the present invention is one. For example, pilot signals on common channels, or signals on common control channels, may fall in to this category.

In some embodiments, one or more signals associated with communications in the wireless communication system, upon which at least a portion of evaluation of a network traffic level is based, are monitored by a wireless device in a predetermined manner for one or more purposes other than evaluation of network traffic levels as in the present invention. For example, in some embodiments, a wireless communication device, operating in accordance with one or more predetermined communication protocols, may routinely monitor aspects of the radio environment to support operations such as cellular handover control, power control, channel quality monitoring, or the like. Embodiments of the present invention may be configured to utilize data, indicative of signals associated with communications in the wireless communication system other than communications with the wireless device, obtained for one or more other purposes. This may provide an advantage, in that embodiments of the present invention may be enabled using data already routinely obtained by a wireless device, which may reduce requirements to configure the wireless device to acquire data indicative of signals in the wireless communication system in other ways.

For example, wireless devices configured to communicate over a CDMA network, such as CDMA2000 or UMTS, for example using HSDPA, are typically configured to perform channel quality measurements, measurements for supporting transmission power control routines, or the like. As an example, wireless devices in a UMTS network are typically required to determine signal quality indicators in relation to a common pilot channel (CPICH), for example to be transmitted to the base station as part of a channel quality indicator (CQI) message. Such signal quality indicators may include versions of pilot signal strength (Ec/Io), receiver power such as received signal code power (RSCP), and the like. These signal quality indicators, or other similar indicators obtained by a wireless device, may be used as input for evaluation of network traffic levels in accordance with embodiments of the present invention. For CDMA networks, signal quality indicators may be associated and/or obtained via correlation with one or more predetermined CDMA spreading codes, so as to measure signal quality on channels defined by such spreading codes.

As another example, wireless devices may be configured to monitor traffic on one or more data and/or control channels by monitoring appropriate signals indicative thereof. For example, a wireless device configured to operate using HSDPA is typically configured to monitor signals on several high-speed shared control channels (HS-SCCH), which contain traffic block assignments of user plane data on a set of shared high-speed physical downlink shared channels (HS-PDSCH). The information on the HS-SCCH may be used as input for evaluation of network traffic levels. The control information contained in received signals on the HS-SCCH channels can typically be decoded regardless of whom it is intended for, but data contained in signals on the HS-PDSCH channels cannot typically be decoded by a wireless device unless it is intended for that wireless device. However, traffic levels and/or power levels can be monitored on the HS-PDSCH channels even if the data cannot be decoded. In embodiments of the present invention, available aspects of one or more signals on monitored channels, such as data, traffic levels, and power levels, may be used as input for evaluation of network traffic levels.

As another example, wireless devices may be configured to monitor traffic on one or more data and/or control channels by monitoring appropriate signals indicative thereof. For example, a wireless device configured to operate using LTE is typically configured to monitor the physical downlink control channel (PDCCH) which contains resource block assignments for user plane data on the physical downlink shared channel (PDSCH). The information on the PDCCH may be used as input for evaluation of network traffic levels.

The present invention is not limited to using information already routinely collected by a wireless device. Rather, embodiments of the present invention may be configured to monitor signals associated with communications in the wireless communication system other than communications with the wireless device which would not otherwise be routinely monitored by the associated wireless device. In some embodiments, this may involve specific provision and/or configuration of hardware, firmware and/or software of the wireless device. A wireless device and/or network interface thereof may therefore be configured to monitor and/or receive signals associated with communications in the wireless communication system in a predetermined manner, for example so as to obtain data indicative of traffic levels in the wireless communication system, received signal power levels, rate of communication events, types of communication occurring, or the like.

In some embodiments, one or more power measurements, traffic level measurements, or the like, may be performed using a radio receiver of the wireless device or other dedicated hardware, such as a radiofrequency power monitor. Data on one or more accessible data channels or control channels may also be monitored and used for evaluation.

In some embodiments, acquiring and/or monitoring signals for evaluating a network traffic level comprises measuring chip energy (Ec) of one or more pilot signals, also sometimes referred to as pilot energy, transmitted in the wireless communication system. For example, chip energy of a pilot signal on a common pilot channel (CPICH) of a UMTS and/or HSDPA network may be sampled using techniques as would be readily understood to a worker skilled in the art, for example as sampled when performing channel quality indicator (CQI) measurements in a UMTS and/or HSDPA network. For example, measuring chip energy (Ec) may involve receiving, digitizing, and processing the pilot signal. Processing of the pilot signal may comprise correlating the signal with a known CDMA code of the pilot signal, possibly with a predetermined timing offset, utilization of a rake receiver, summing, adding or integrating chip energy, or the like.

In some embodiments, acquiring and/or monitoring signals for evaluating a network traffic level comprises measuring, at a receiver, energy or power on one or more predetermined radio frequency bands, time intervals, energy of signals corresponding to one or more spreading codes or frequency hopping schedules, or the like.

In some embodiments, acquiring and/or monitoring signals for evaluating a network traffic level comprises measuring, at a receiver, energy or power on one or more channels, such as physical or logical channels, for example a CPICH of a UMTS and/or HSDPA network. For example, energy (Io), which may be related to total received power, background radio power, or interference power per unit frequency of a pilot channel such as a CPICH may be sampled using components such as a network interface, digitizing equipment such as an analog-to-digital converter, digital signal processor, wireless receiver, or the like.

In some embodiments, acquiring and/or monitoring signals for evaluating a network traffic level comprises measuring chip energy (Ec) relative to total energy (Io), for example by dividing chip energy by total energy. This ratio (Ec/Io) may be interpreted as a signal-to-noise ratio (SNR) or signal-to-interference-plus-noise ratio (SINR), for example where the signal is a pilot signal of the channel being monitored, and the noise or interference-plus-noise corresponds to total current communication on the channel being monitored. In some embodiments, chip energy (Ec) and total energy (Io) may be measured for a predetermined channel such as a CPICH of a UMTS and/or HSDPA network. As would be readily understood by a worker skilled in the art, measurements of Ec/Io for a pilot channel may be routinely obtained by wireless devices operating in some CDMA communication systems.

In some embodiments, acquiring and/or monitoring signals for evaluating a network traffic level comprises measuring power, related to communication on one or more communication channels, received at the wireless device. Power measured at the receiver may be measured in milliwatts (mW) or dBm, for example. Power may be measured in one or more predetermined frequency bands, time slots, for one or more predetermined CDMA codes, or the like, in accordance with the communication protocol being used in the wireless communications system. For example, in a CDMA system such as UMTS and/or HSDPA system, received signal code power (RSCP) may be measured as collected RF energy of signals on a predetermined channel after a correlation/descrambling process, wherein the correlation process is performed by correlating the received signal to a predetermined CDMA code, such as Walsh spreading codes, pseudonoise codes such as Gold codes, or the like. Power measured at the receiver may be proportional to the amount of radio traffic in the area around the wireless device.

In some embodiments, acquiring and/or monitoring signals for evaluating a network traffic level comprises measuring both chip energy (Ec) relative to total energy (Io), for example Ec/Io, and receiver power, for example RSCP. For example, as network traffic on a channel increases. Ec/Io measurements typically decrease, and receiver power measurements typically increase. This is because there is increased radio activity, which reduces the relative strength of the pilot signal. By using plural measurements, a more reliable picture of the radio environment may be obtained.

In some embodiments, acquiring and/or monitoring signals for evaluating a network traffic level comprises measuring a received signal strength indicator (RSSI), such as given by the formula RSSI=RSCP−Ec/Io. In some embodiments, acquiring and/or monitoring signals for evaluating a network traffic level comprises measuring a received channel power indicator (RCPI), which is a measure of the received RF power in a selected channel over an entire received frame and preamble in an IEEE 802.11 network. Other similar measurements of received power in a radio system may also be used, as would be readily understood by a worker skilled in the art.

In some embodiments, acquiring and/or monitoring signals for evaluating a network traffic level comprises monitoring data on one or more channels, such as the HS-SCCH of a HSDPA-enabled wireless communication system or another shared control channel of a wireless communication system. Such monitored channels may be unencrypted, or otherwise readable by plural wireless devices in a wireless communication network. For example, the HS-SCCH control channel, commonly readable by a number of devices in a cellular network, provides download signalling related to the HS-DSCH channel, such as timing and coding information for managing sharing of the HS-PDSCH channels, for example for facilitating appropriate wireless devices to listen to the HS-DSCH at the appropriate time and using the appropriate codes for receiving information meant for each wireless device. Similarly, other shared control channels for mediating access to other shared or common data channels may be monitored in accordance with embodiments of the present invention.

In some embodiments, the amount of traffic on a shared control channel may be an indicator of the amount of network traffic in the wireless communication system. For example, activity on an HS-SCCH typically increases with the amount of network traffic. In accordance with embodiments of the present invention, a wireless device can be configured to decode messages on one or more shared control channels and estimate from those messages a network traffic level. For example, a network traffic level may be determined by tracking the number of different message recipients, tracking the arrival rate of control messages and correlating this, via a predetermined model, with an inferred or estimated network traffic level.

In some embodiments, the assigned Walsh codes for a HS-SCCH channel are sent to the wireless device in a radio bearer setup message. The wireless device may therefore need to set up a bearer at least once to obtain these codes. However, once the codes are obtained, they may be valid for an extended or indefinite period of time.

In some embodiments, the HSDPA system may be configured to support HS-SCCH less operation, as it is known in the art. In this case, the present invention may be configured to take into account some inaccuracy in measuring network traffic level, as some HS-PDSCH channels may be assigned without explicit HS-SCCH activity.

In some embodiments, acquiring and/or monitoring signals for evaluating a network traffic level comprises measuring traffic levels and/or power levels on one or more channels, such as HS-PDSCH channels of a HSDPA system. Traffic levels and power levels on one or more channels may be measured without decoding the data carried by various messages on the channels, for example, by tuning the network interface to a channel and monitoring radio activity thereon. Power may be measured as code domain power, power spectra, power in predetermined time slots, amplitude of received quadrature phase shift keying (QPSK) or quadrature amplitude modulation (QAM) or other physical layer signals, or the like. In some embodiments, measuring traffic levels and/or power levels on a first set of one or more channels allows an inference of traffic levels and/or power levels on a second set of one or more channels, for example as described herein. Such an inference may be based on a known or assumed relationship between channels of certain types, based on knowledge of operation of certain communication protocols.

In some embodiments of the present invention, acquiring and/or monitoring signals for evaluating network traffic level comprises tracking timings relating to core network responses to messaging, for example attach requests and/or the like. The core network may be considered to be at least a portion of the network backbone, serving general packet radio service support node (SGSN), a gateway general packet radio service node (GGSN), or the like.

In embodiments of the present invention, acquiring and/or monitoring signals for evaluating a network traffic level comprises plural measurements such as those described above. Using plural measurements may improve reliability of evaluation of network traffic levels, since inherent deficiencies or uncertainties in some measurements may be compensated by other measurements. Using plural measurements of different aspects of the wireless communication system may improve accuracy of measurements and/or evaluation of network traffic levels, since a larger sample size of data may be used to generate statistically more accurate information.

Evaluation of Network Traffic Level

In accordance with embodiments of the present invention, evaluation of network traffic levels may be performed in one or more different ways, and/or based on one or more different signals associated with the wireless communication system, for example as described in more detail herein. In some embodiments, plural evaluation operations and/or evaluation based on measurements of plural signals associated with the wireless communication system may be performed for improved accuracy and/or reliability. Evaluation of network traffic levels may be based on passively monitored aspects of signals in the wireless communication system, such as received energy or power, pilot strength, normalized pilot strength, SNR, SINR, message arrival rates, control channel message contents, indirectly measured or inferred channel power levels, or the like related to one or more communication channels and processing data acquired from said monitoring. Evaluation of network traffic levels may be configured based at least in part on the type of wireless communication system being evaluated.

In embodiments of the present invention, evaluation of network traffic levels may be performed by a general-purpose or special-purpose computer processor operatively coupled to memory containing appropriate computer instructions for performing predetermined evaluation operations. In some embodiments, a control system of a wireless device, for example comprising such a computer processor operatively coupled to memory, or equivalent electronic components, may be configured for evaluation of network traffic levels and control of communications of the wireless device. In some embodiments, the control system may comprise standard provided hardware of the wireless device, configured in accordance with the present invention, for example by software or firmware.

In some embodiments, evaluating traffic levels comprises performing one or more data processing operations on data representative of acquired or monitored signals, such as filtering, averaging, integrating, or the like. Data processing may be performed in accordance with one or more statistical analysis methods, time-series analysis methods, filtering methods such as Kalman, Hidden Markov Model (HMM) or particle filtering, averaging, windowed or moving averaging, integration, comparison with thresholds, spectral or code domain power analysis, quantization, or the like, or a combination thereof.

In embodiments, evaluation comprises determining a measurement indicative of network traffic level, for example a moving average or windowed average, based on signals associated with communications in the wireless communication system. In some embodiments, evaluation comprises comparing an averaged measurement indicative of network traffic level with one or more threshold levels. For example, if the averaged or un-averaged measurement indicative of network traffic level exceeds a predetermined threshold for a predetermined period of time, then a "high traffic condition" may be considered to occur. A measurement indicative of network traffic level may be an actual measurement of the network traffic level, such as a count of active devices in the network at a given time, or it may be a measurement of a quantity which varies in a known or assumed way with respect to the network traffic level.

In some embodiments, evaluation of one or more first aspects of network traffic levels may be performed indirectly, from information obtained about one or more second aspects of network traffic levels, along with knowledge related to operating standards of the wireless communication system. For example, in some embodiments, high network activity on some channels implies a high likelihood of high network activity on other channels. For example, activity levels on control channels, data channels, and feedback or acknowledgement channels typically increase or decrease together.

In some embodiments, a wireless device such as a base station is limited to a predetermined power budget, and is configured to allocate power to transmit substantially concurrently on plural channels while respecting that power budget. For example, a UMTS base station with both HSDPA capability and Release 99 capability typically transmits data on HSDPA channels such as the HS-PDSCH channels and HS-SCCH channels, as well as dedicated channels (DCH) as described in 3GPP Release 99, and other common channels. In some embodiments, the UMTS base station (Node B) is configured to perform dynamic power allocation, as would be readily understood by a worker skilled in the art. For example, the base station may vary transmit power for the HS-PDSCH, HS-SCCH and DCH channels, while maintaining the same transmit power for the other common channels. The transmit power for these channels may be allocated so that substantially all available power in the power budget is used at a given time. This is typically performed by allocating all power that has been left over from the DCH and common channels to the HSDPA channels.

Figure 4:
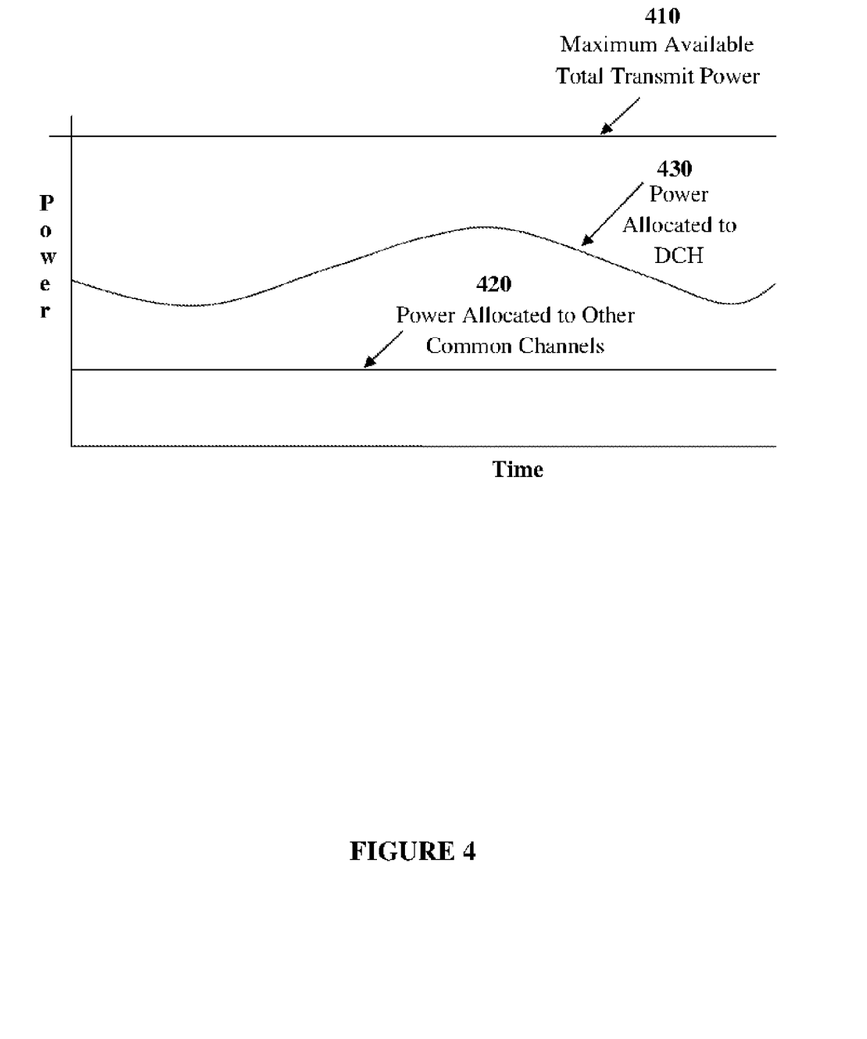
FIG. 4 illustrates a graph showing allocation of transmission power versus time for a dynamic power allocation algorithm performed by a UMTS base station configured with both HSDPA and Release 99 capabilities.

FIG. 4 illustrates an example graph of time evolution of allocation of available transmission power in accordance with dynamic power allocation, as performed by a UMTS base station or Node B configured with both HSDPA and Release 99 data communication capabilities. The horizontal axis represents time and the vertical axis represents power. The horizontal line 410 represents the maximum total transmit power available, in accordance with the power budget. Dynamic power allocation allocates substantially all of this power for use by the HS-PDSCHs and HS-SCCHs. DCHs, and other common channels. The horizontal line 420 represents the amount of power statically allocated to the other common channels. The distance from the horizontal line 420 to the curve 430 represents the amount of power allocated to the DCHs. The remainder of the power, as represented by the distance from the curve 430 to the horizontal line 420, is allocated to the HS-PDSCHs and HS-SCCHs.

In some embodiments, therefore, by determining a first amount of power, allocated to the HSDPA channels such as the HS-PDSCH, HS-SCCH, and given knowledge of a base station power budget and a second amount of power allocated to other common channels, the present invention may be configured to indirectly measure the amount of power allocated to the DCH channels by subtracting the first amount of power and the second amount of power from the power budget. In some embodiments, the present invention may be configured to detect that a UMTS base station is operating in a dynamic power allocation mode if power allocated to the HSDPA channels is time-varying. Otherwise, if the base station is operating in a static power allocation mode, other methods may be used for evaluating network traffic.

In some embodiments, the accuracy of a measurement of network traffic level may depend on what level of congestion is measured. For example, when network traffic levels are near zero, a measurement of network traffic level may be highly accurate, whereas when network traffic levels are near 50% of the maximum load, a measurement of network traffic level may be relatively inaccurate. Increased accuracy may be obtained by using a plurality of available methods to measure the network traffic level.

In some embodiments of the present invention, wherein acquiring and/or monitoring signals for evaluating network traffic level comprises tracking timings relating to core network responses to messaging, when tracked timings exceed a predetermined threshold, a busy core network can be inferred, thereby resulting in the delay of non-time sensitive data. According to some embodiments, a base line or normal or a predetermined threshold for the timings, for example message response timings, can be dynamically measured or pre-provisioned by the mobile network operator (MNO).

Operation Based on Evaluated Network Traffic Levels

Embodiments of the present invention are configured to control operation of a wireless device, by controlling transmission of data based upon an evaluated network traffic level. For example, a control system of a wireless device may be configured to control transmission of data by delaying or deferring pending or arising communications to be transmitted by the wireless device when the network traffic level is indicative of "high traffic conditions," and transmitting pending or arising communications otherwise.

In some embodiments, controlling operation of the wireless device based on a network traffic level comprises processing information indicative of the network traffic level, for example related to evolution of the network traffic over time, and making a transmission decision based thereon. For example, an instantaneous or average, for example moving average or windowed average, or otherwise filtered indicator of the network traffic level may be compared to a predetermined threshold, and a decision to transmit data from the wireless device may be made if the instantaneous, average or filtered network traffic level is below the predetermined threshold, possibly for a predetermined period of time. As another example, once a suitably filtered indicator of the network traffic level falls below a predetermined threshold, an integral, representative of the cumulative difference between the threshold and the suitably filtered indicator of the network traffic level may be periodically calculated. A decision to transmit data from the wireless device may be made once the calculated integral reaches a predetermined level. As yet another example, once a suitably filtered indicator of the network traffic level falls below a predetermined threshold, and if the rate of change of the network traffic level over time stays below another predetermined threshold for a predetermined period of time, a decision to transmit data from the wireless device may be made. A combination of the above or other example techniques may also be used in embodiments of the present invention.

In embodiments of the present invention, filtering and averaging of indicators of network traffic level may be performed using elements of one or more appropriate filtering or estimation techniques known in the art. These may include, for example, high-pass, low-pass or bandpass filtering, finite impulse response (FIR) filtering, Kalman filtering, particle filtering, hidden Markov model (HMM) filtering, or the like. Additionally, implementation of transmission decision rules based on filtered or unfiltered indicators of network traffic level may be performed using elements of one or more appropriate decision or control techniques known in the art. These may include, for example, proportional-integral-derivative (PID) control, linear or nonlinear control, control based on dynamic programming, Markov decision processes, partially observed Markov decision processes, or the like.

In some embodiments, delaying or deferring of communications may comprise storing the communications in memory, for example implemented as a buffer or queue. In some embodiments, delaying or deferring of communications may comprise sending a message to a client device or module operatively coupled to and being serviced by the wireless device, telling the client device or module to re-send a communication at a later time for transmission by the wireless device.

In some embodiments, for example when data is completely delay-tolerant, in the sense that it can be deferred indefinitely, or in the sense that the wireless device or method of the present invention is configured to support "best effort" transmission of data, pending or arising communications may be deferred indefinitely. In some embodiments, for example when data is delay-tolerant only up to a point, or in the sense that the wireless device or method of the present invention is configured to guarantee at least some predetermined quality of service, pending or arising communications may be deferred up to a point, but then transmitted.

For example, in some embodiments, a pending communication which has been delayed for a predetermined period may be transmitted regardless of network traffic conditions. In this case, embodiments of the present invention may attempt to avoid transmitting during high traffic conditions, but not at the expense of delaying communication messages by longer than the predetermined period. In some embodiments, the predetermined period may be a function of a priority level or other indicator of delay tolerance associated with the pending communication. As another example, in some embodiments, a pending communication may be associated with an indicator of delay tolerance, such as a priority level, and a delay time, wherein the delay time can be indicative of how long the pending communication has been presently delayed.

In some embodiments, measures may be taken to avoid a large number of wireless devices, operating in accordance with the present invention, from simultaneously transmitting once the network traffic is determined to be in a condition for which transmission is allowable. For example, each of a plurality of wireless devices may be configured with a different threshold level, wherein each wireless device is configured to transmit when the network traffic level falls below its own configured threshold level. As another example, each of a plurality of wireless devices may be configured to delay transmission, for example by a random time, after the network traffic is determined to be in a condition for which transmission is allowable. Other approaches for avoiding simultaneous transmission, such as collision avoidance techniques, carrier sense multiple access (CSMA) techniques, and the like, may also be implemented in embodiments of the present invention.

In some embodiments, other information, such as time-of-day or historical trends in network traffic levels, may be used along with the evaluated network traffic level for controlling communication operation of a wireless device.

Wireless Device

Embodiments of the present invention relate to a wireless device configured for communication with a wireless communication system, or a method for managing communication of such a wireless device. The wireless device may be a specially-provided wireless device or a standard wireless device configured, for example via software and/or firmware, in accordance with the present invention.

Figure 5:
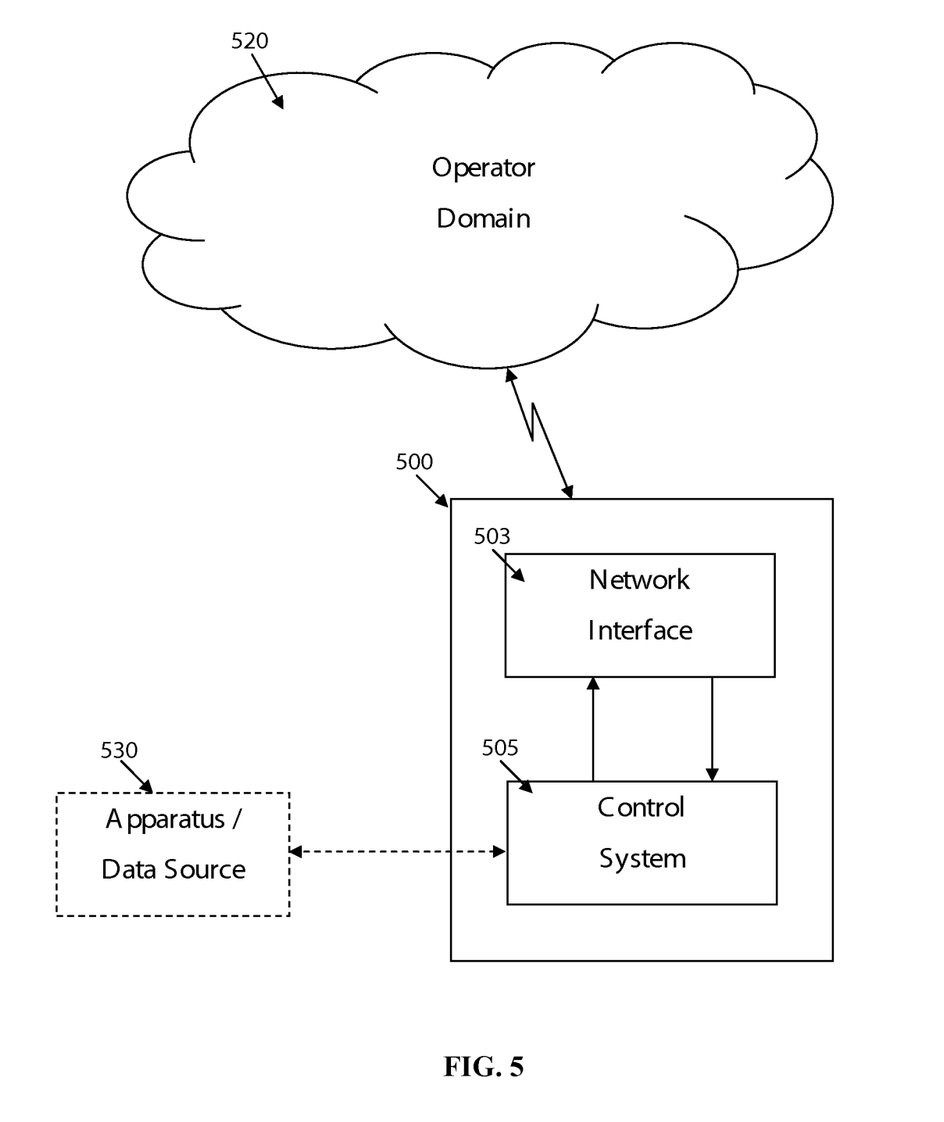
FIG. 5 illustrates a wireless device for communication with a wireless communication system, in accordance with an embodiment of the present invention.

FIG. 5 illustrates a wireless device 500 according to an embodiment of the present invention that can be operatively connected to an operator domain 520. The wireless device 500 comprises a network interface 503 and a control system 505. The network interface 503 is provided to establish an operative connection with the wireless communication system. The control system 505 is provided for controlling when an operative coupling of the wireless device 500 to the network interface 503 is established, what operational condition the wireless device is shifted to and to perform predetermined other functions required for operating the wireless device 500. The wireless device may further be operatively coupled to an apparatus 530, such as a utility meter reader, a teller machine, a vehicle surveillance device, a device for remote control or machinery, or other data source providing data, such as delay-tolerant data, for transmission by the wireless device 500, said transmission comprising wireless communication with the operator domain 520.

In some embodiments, a wireless device may be a machine-to-machine (M2M) or machine-type communication (MTC) device. In some embodiments, a wireless device may be used to provide at least communication functionality of an apparatus such as a utility meter reader, a teller machine, a vehicle surveillance device, a device for remote control or machinery or other apparatus. The wireless device may be operatively coupled to such an apparatus via a wired or local wireless connection, and/or the wireless device may be integrated as a component of such an apparatus. The wireless device may comprise electronics such as a data interface for communication with such an apparatus, along with other components as required, such as memory for storing said communications, and a processor for processing and responding to said communications.

The network interface of a wireless device is configured for operatively connecting the wireless device with the wireless communication system. Depending on the embodiment, the wireless communication system interface can operatively interconnect the wireless device with one or more components of the wireless communication system via one or more wireless interfaces and one or more communication protocols and wireless interconnect systems. For example, the network interface may be connected with an uplink or downlink or both uplink and downlink of a BTS/Node B. The wireless communication system interface may include GPRS, UMTS, EVDO, or other wired or wireless interconnect systems. The network interface comprises wireless communication components such, as one or more antennas, signal amplifiers, digital signal processors, modulators, radio transceivers, power sources, power control systems, digital interfaces, and the like, as would be readily understood by a worker skilled in the art.

The control system is operatively coupled to the network interface for processing data and controlling communication and functions of the wireless device. The control system is configured to receive, via the network interface, signals associated with communications in the wireless communication system, or other information indicative of network traffic, and to evaluate a network traffic level based thereon. The control system may further be configured to control transmission of data from the network interface based upon the network traffic level. The control system may implement one or more filtering and estimation operations, decision and control operations, and the like.

In embodiments of the present invention, the control system comprises electronic components such as a microprocessor operatively coupled to memory, or a microcontroller or the like. Memory, such as RAM, ROM, electronic, magnetic or optical memory may be configured with instructions for execution on a processor for performing operations in accordance with the present invention. The control system may comprise an electronic interface for passing messages to the network interface for transmission, and for receiving information from the network interface indicative of signals associated with communications in the wireless communication system. The control system may also be operatively coupled to a data interface of the wireless device for receiving messages for transmission from an apparatus coupled thereto.

The invention will now be described with reference to specific examples. It will be understood that the following examples are intended to describe embodiments of the invention and are not intended to limit the invention in any way.

EXAMPLE

Figure 6:
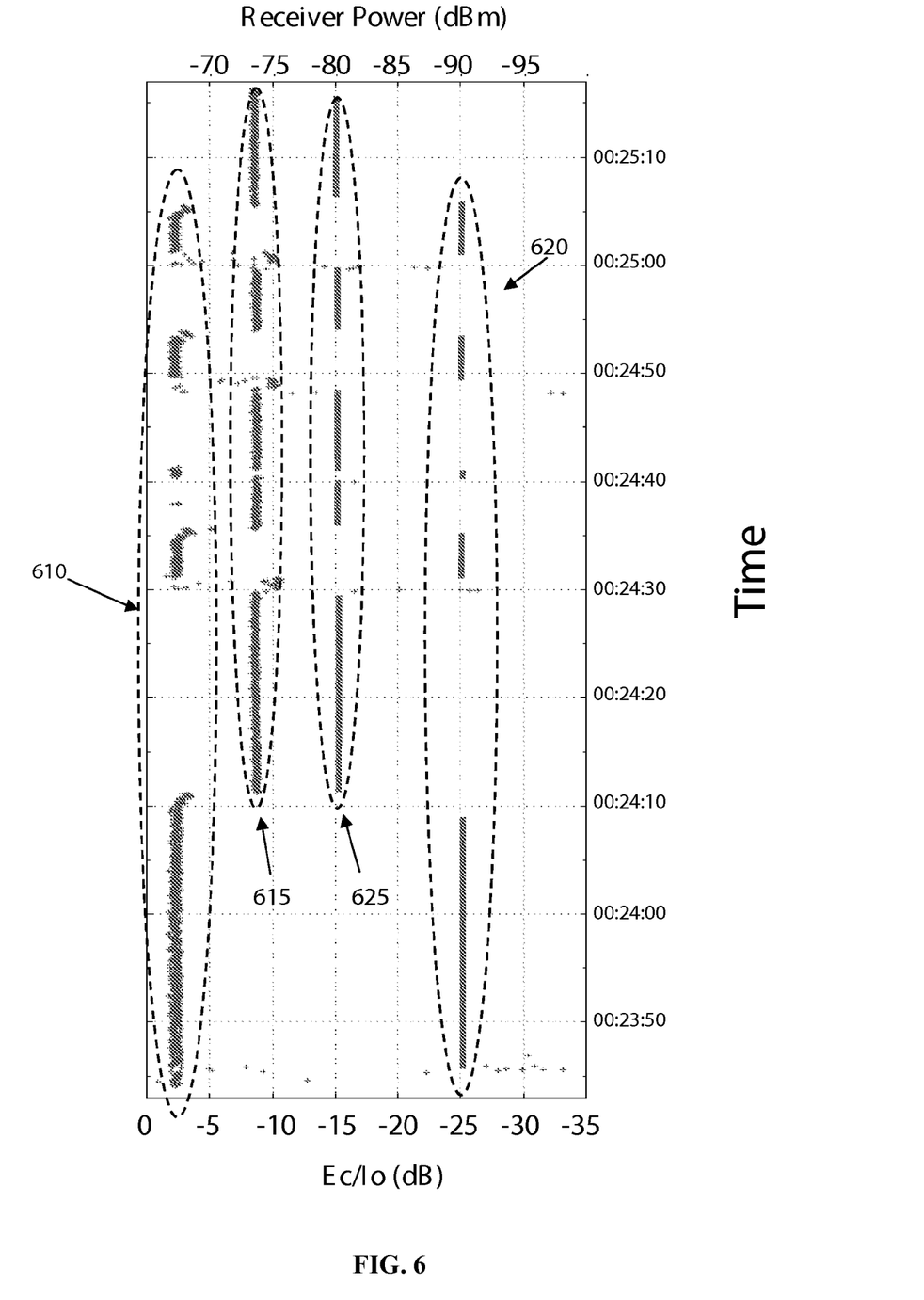
FIG. 6 illustrates an example of evolution of both chip energy over total energy (Ec/Io) measurements and receiver power measurements over time, as traffic levels in a UMTS wireless communication system vary, in accordance with an embodiment of the present invention.

FIG. 6 illustrates evolution of both chip energy over total energy (Ec/Io) measurements and receiver power measurements over time, as traffic levels in a UMTS wireless communication system vary. Ec/Io measurements are represented by the upper traces 610 and 615, and are measured against the left-hand scale, varying between about 0 dB and −10 dB. Receiver power measurements are represented by the lower traces 620 and 625, and are measured against the right-hand scale, varying between about −80 dBm and −90 dBm. Time is marked off in increments of about 10 seconds each. For illustration, traffic conditions are switched between low traffic conditions and high traffic conditions. When there are little or no traffic channels assigned, that is under low traffic conditions, measurements of Ec/Io are between 0 dB and −5 dB, as represented by the trace 610, and measurements of receiver power are at about −90 dBm, as represented by trace 620. When there are many traffic channels assigned, that is under high traffic conditions, measurements of Ec/Io decrease to between −5 dB and −10 dB, as represented by the trace 615, and measurements of receiver power increase to about −80 dBm, as represented by trace 625. The illustrated inverse relationship between traffic levels and Ec/Io measurements, and/or the illustrated direct relationship between traffic levels and receiver power measurements, may be used in embodiments of the present invention to evaluate network traffic level by measuring Ec/Io and/or radio power at the receiver.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer and/or firmware according to the method of the invention and/or to structure its components in accordance with the system of the invention.

In addition, while portions of the above discuss the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like, or system of computers, and pursuant to one or more, or a part of one or more, program elements, modules or objects generated from any programming language, such as C++, C#, Java. PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for managing communication of a wireless device with a wireless communication system, the method comprising:
   a. evaluating a network traffic level based partially or fully upon signals associated with communications in the wireless communication system, said signals associated with communications involving devices other than the wireless device, wherein said signals are monitored and evaluated using the wireless device, wherein the network traffic level represents a total amount of signaling traffic caused by wireless communication devices within the wireless communication system relative to an amount of traffic sustainable by the wireless communication system; and
   b. selectively transmitting delay-tolerant data from the wireless device based upon the network traffic level by transmitting said delay-tolerant data when the network traffic level is below a predetermined threshold and refraining from transmitting said delay-tolerant data when the network traffic level is above the predetermined threshold;
   wherein evaluating the network traffic level is based partially or fully on an indirect measurement of radio power made independently by the wireless device, the indirect measurement comprising performing a first measurement of radio power associated with a first set of one or more channels of the wireless communication system and inferring radio power associated with a second set of one or more channels of the wireless communication system based on the first measurement of radio power.

2. The method according to claim 1, wherein the wireless device is a machine-to-machine or machine-type-communication device, and said delay-tolerant data is representative of delay-tolerant communication.

3. The method according to claim 1, wherein selectively transmitting said delay-tolerant data from the wireless device is further based upon a current priority level of said delay-tolerant data.

4. The method according to claim 1, further comprising obtaining at least one measurement of said signals using the wireless device, the at least one measurement indicative of one or more of: radio energy, radio power, signal-to-noise ratio, signal-to-interference-plus-noise ratio, traffic on a shared control channel, pilot signal strength, message arrival rate, and message contents on a shared control channel, the at least one measurement associated with one or more channels of the wireless communication system.

5. The method according to claim 4, wherein evaluating the network traffic level further comprises data processing of one or more of said at least one measurement.

6. The method according to claim 1, wherein evaluating the network traffic level is based partially or fully on a measurement of chip energy (Ec) of a pilot signal transmitted on a predetermined channel of the wireless communication system relative to radio energy (Io) on at least said predetermined channel.

7. The method according to claim 1, wherein evaluating the network traffic level is based partially or fully on a measurement of radio power received by the wireless device on one or more predetermined channels of the wireless communication system.

8. The method according to claim 1, wherein evaluating the network traffic level comprises determining an amount of traffic on one or more shared control channels of the wireless communication system.

9. The method according to claim 1, wherein evaluating the network traffic level is based partially or fully on message response timings, be network traffic level being determined as a function of time delays in generating message responses of a predetermined type.

10. A wireless device for communication with a wireless communication system, the wireless device comprising:
 a. a network interface for establishing an operative connection with the wireless communication system; and
 b. a control system operatively coupled to the network interface, the control system configured to evaluate a network traffic level based partially or fully upon signals received via the network interface and associated with communications in the wireless communication system, said signals associated with communications involving devices other than the wireless device, wherein the network traffic level represents a total amount of signaling traffic caused by wireless communication devices within the wireless communication system relative to an amount of traffic sustainable by the wireless communication system, the control system further configured to selectively control transmission of delay-tolerant data from the network interface based upon the network traffic level by transmitting said delay-tolerant data when the network traffic level is below a predetermined threshold and refraining from transmitting said delay-tolerant data when the network traffic level is above the predetermined threshold, wherein the control system is configured to evaluate the network traffic level based partially or fully on an indirect measurement of radio power made independently by the wireless device, the indirect measurement comprising performing a first measurement of radio power associated with a first set of one or more channels of the wireless communication system and inferring radio power associated with a second set of one or more channels of the wireless communication system based on the first measurement of radio power.

11. The wireless device according to claim 10, wherein the wireless device is a machine-to-machine or machine-type-communication device, and wherein said delay-tolerant data is representative of delay-tolerant communication.

12. The wireless device according to claim 10, wherein the control system is further configured to transmit said delay-tolerant data from the wireless device, based partially upon a current priority level of the data.

13. The wireless device according to claim 10, further configured to obtain at least one measurement of said signals, the at least one measurement indicative of one or more of: radio energy, radio power, a signal-to-noise ratio, signal-to-interference-plus-noise ratio, traffic on a shared control channel, pilot signal strength, message arrival rate, and message contents on a shared control channel, the at least one measurement associated with one or more channels of the wireless communication system.

14. The wireless device according to claim 13, wherein one or more of the at least one measurement is a data processed measurement, the data processed measurement performed by one or more data processing operations of the control system.

15. The wireless device according to claim 10, wherein the control system is configured to evaluate the network traffic level based partially or fully on a measurement of chip energy (Ec) of a pilot signal transmitted on a predetermined channel of the wireless communication system relative to radio energy (Io) on at least said predetermined channel.

16. The wireless device according to claim 10, wherein the control system is configured to evaluate the network traffic level based partially or fully on a measurement of radio power received by the wireless device on one or more predetermined channels of the wireless communication system.

17. The wireless device according to claim 10, wherein the control system is configured to evaluate the network traffic level based partially or fully on evaluation of an amount of traffic on one or shared control channels of the wireless communication system.

18. The wireless device according to claim 10, wherein the control system is configured to evaluate the network traffic level based partially or fully on message response timings, the network traffic level being determined as a function of time delays in generating message responses of a predetermined type.

19. A computer program product comprising a non transitory computer-readable medium comprising computer readable code embodied therein, for execution by a CPU, for performing a method for managing communication of a wireless device with a wireless communication system, the method comprising:
 a. evaluating a network traffic level based partially or fully upon signals associated with communications in the wireless communication system, said signals associated with communications involving devices other than the wireless device, wherein the network traffic level represents a total amount of signaling traffic caused by wireless communication devices within the wireless communication system relative to an amount of traffic sustainable by the wireless communication system; and
 d. selectively transmitting delay-tolerant data from the wireless device based upon the network traffic level by transmitting said delay-tolerant data when the network traffic level is below a predetermined threshold and refraining from transmitting said delay-tolerant data when the network traffic level is above the predetermined threshold;
 wherein evaluating the network traffic level is based partially or fully on an indirect measurement of radio power made independently by the wireless device, the indirect measurement comprising performing a first measurement of radio power associated with a first set of one or more channels of the wireless communication system and inferring radio power associated with a second set of one or more channels of the wireless communication system based on the first measurement of radio power.

20. A method for managing communication of a wireless device with a wireless communication system, the method comprising:
 a. monitoring signals associated with communications in the wireless communication system, said signals representative of communications involving wireless devices other than and excluding the wireless device, wherein said signals are monitored using the wireless device;
 b. using said signals for evaluation of a network traffic level, wherein said evaluation is performed by the wireless device; and
 c. selectively transmitting application data from the wireless device based upon the evaluated network traffic level by transmitting said delay-tolerant data when the network traffic level is below a predetermined threshold and refraining from transmitting said delay-tolerant data when the network traffic level is above the predetermined threshold;

wherein evaluation of the network traffic level is based partially or fully on an indirect measurement of radio power made independently by the wireless device, the indirect measurement comprising performing a first measurement of radio power associated with a first set of one or more channels of the wireless communication system and inferring radio power associated with a second set of one or more channels of the wireless communication system based on the first measurement of radio power.

21. The method according to claim 20, wherein said communication of the wireless device with the wireless communication system corresponds to communication of the wireless device with a base station of the wireless system.

22. The method according to claim 20, wherein said communication of the wireless device with the wireless communication system corresponds to communication of the wireless device with a base station of the wireless system, and wherein said communications involving wireless devices other than and excluding the wireless device correspond to communications between the base station and wireless devices other than and excluding the wireless device.

23. The method according to claim 1, wherein inferring said radio power associated with the second set of one or more channels comprises subtracting the first measurement of radio power from a predetermined power budget.

24. The wireless device according to claim 10, wherein inferring said radio power associated with the second set of one or more channels comprises subtracting the first measurement of radio power from a predetermined power budget.

* * * * *